United States Patent [19]
Henry

[11] Patent Number: 6,048,471
[45] Date of Patent: *Apr. 11, 2000

[54] ZERO VOLATILE ORGANIC COMPOUND COMPOSITIONS BASED UPON ORGANIC SOLVENTS WHICH ARE NEGLIGIBLY REACTIVE WITH HYDROXYL RADICAL AND DO NOT CONTRIBUTE APPRECIABLY TO THE FORMATION OF GROUND BASED OZONE

[75] Inventor: Richard G. Henry, 498 S. Belvoir Blvd., Euclid, Ohio 44121

[73] Assignee: Richard G. Henry, Beachwood, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/022,779

[22] Filed: Feb. 12, 1998

Related U.S. Application Data

[60] Provisional application No. 60/053,073, Jul. 18, 1997.

[51] Int. Cl.⁷ .............................. B01F 1/00; C11D 3/48; C08J 3/02
[52] U.S. Cl. .......................... 252/364; 510/382; 106/236
[58] Field of Search ........................... 252/364; 510/382; 106/236

[56] References Cited

U.S. PATENT DOCUMENTS

| | | | |
|---|---|---|---|
| 3,665,034 | 5/1972 | Komatsu et al. | 554/129 |
| 3,768,232 | 10/1973 | Farber et al. | 95/106 |
| 3,773,676 | 11/1973 | Boyles | 510/171 |
| 3,773,677 | 11/1973 | Boyles | 510/170 |
| 3,884,852 | 5/1975 | Sheppard | 524/39 |
| 3,888,808 | 6/1975 | Downs et al. | 523/456 |
| 3,893,960 | 7/1975 | Sheppard | 524/294 |
| 3,923,912 | 12/1975 | Beckers | 570/117 |
| 3,924,455 | 12/1975 | Begishagen et al. | 73/762 |
| 3,937,665 | 2/1976 | Mammino et al. | 134/42 |
| 3,950,185 | 4/1976 | Toyama et al. | 134/38 |
| 3,966,650 | 6/1976 | Prokai | 521/111 |
| 4,020,216 | 4/1977 | Miller | 428/423.7 |
| 4,029,616 | 6/1977 | Nakashio et al. | 524/732 |
| 4,096,083 | 6/1978 | Clementson | 134/39 |
| 4,221,829 | 9/1980 | Vargiu et al. | 427/222 |
| 4,248,636 | 2/1981 | Sasaki et al. | 106/23 |
| 4,260,510 | 4/1981 | Hey et al. | 510/409 |
| 4,268,407 | 5/1981 | Hey et al. | 510/409 |
| 4,280,006 | 7/1981 | Blount | 521/154 |
| 4,317,752 | 3/1982 | Blount | 521/159 |
| 4,337,968 | 7/1982 | Maierson | 503/207 |
| 4,389,503 | 6/1983 | Maxwell et al. | 524/38 |
| 4,414,341 | 11/1983 | Williams | 523/340 |
| 4,423,095 | 12/1983 | Blizzard | 427/387 |
| 4,537,934 | 8/1985 | Fock et al. | 525/123 |
| 4,543,206 | 9/1985 | Adams | 510/118 |
| 4,624,970 | 11/1986 | Dwyer et al. | 521/131 |
| 4,637,958 | 1/1987 | Wegehaupt et al. | 428/416 |
| 4,683,075 | 7/1987 | Wilson et al. | 510/177 |
| 4,814,100 | 3/1989 | Merchant et al. | 510/177 |
| 4,843,170 | 6/1989 | Isshiki et al. | 560/261 |
| 4,898,893 | 2/1990 | Ashida | 521/131 |
| 5,034,154 | 7/1991 | Yezrielev et al. | 252/364 |
| 5,035,833 | 7/1991 | Ogawa et al. | 252/182.24 |
| 5,041,287 | 8/1991 | Driggers et al. | 424/78.35 |
| 5,051,153 | 9/1991 | Berg | 203/60 |
| 5,072,028 | 12/1991 | Fishler et al. | 560/221 |
| 5,091,104 | 2/1992 | Van Der Puy | 252/171 |
| 5,102,563 | 4/1992 | Desbiendras et al. | 510/177 |
| 5,104,915 | 4/1992 | Paci | 524/32 |
| 5,120,470 | 6/1992 | Ohmure et al. | 252/364 |
| 5,124,063 | 6/1992 | Logsdon et al. | 510/258 |
| 5,242,502 | 9/1993 | Rowe | 134/10 |
| 5,244,507 | 9/1993 | Rowe | 134/38 |
| 5,256,453 | 10/1993 | Heithorn et al. | 427/415 |
| 5,342,865 | 8/1994 | Zwinselman et al. | 523/414 |
| 5,376,717 | 12/1994 | Patel et al. | 524/314 |
| 5,407,977 | 4/1995 | Everett et al. | 523/429 |
| 5,443,762 | 8/1995 | Rowe | 252/364 |
| 5,468,417 | 11/1995 | LeGrow | 510/118 |
| 5,480,920 | 1/1996 | Sharma et al. | 523/161 |
| 5,484,546 | 1/1996 | Minor et al. | 252/67 |
| 5,495,040 | 2/1996 | Patel et al. | 560/190 |
| 5,578,137 | 11/1996 | Shealy | 134/42 |
| 5,605,647 | 2/1997 | Nimitz et al. | 252/2 |
| 5,637,139 | 6/1997 | Morelos et al. | 106/31.37 |
| 5,733,472 | 3/1998 | Minor et al. | 252/67 |
| 5,801,136 | 9/1998 | Henry | 510/175 |
| 5,814,595 | 9/1998 | Flynn et al. | 510/411 |
| 5,849,806 | 12/1998 | St. Clair et al. | 521/109.1 |

FOREIGN PATENT DOCUMENTS

| | | |
|---|---|---|
| 8-302316 | 11/1996 | Japan . |
| 10-279835 | 10/1998 | Japan . |
| WO 92/09651 | 6/1992 | WIPO . |

OTHER PUBLICATIONS

Hawley's Condensed Chemical Dictionary, 11$^{th}$ Edition Sax, N. Irving and Richard J. Lewis, 1987.
"Alliance for Responsible Atmospheric Policy," EPA submission document, Sep. 25, 1995.

*Primary Examiner*—C. H. Kelly
*Assistant Examiner*—LaToya Cross
*Attorney, Agent, or Firm*—Fay, Sharpe, Beall, Fagan, Minnich & McKee LLP.

[57] ABSTRACT

Environmentally-safer resin-solvent compositions are provided which are generally free of volatile organic compounds (VOCs). The solvent and resin-solvent compositions may replace high-VOC hydrocarbon solvents for use in inks, coatings, adhesives and the like. These novel compositions are negligibly reactive with hydroxyl radicals and therefore are able to reach higher into the atmosphere before decomposing.

40 Claims, No Drawings

ZERO VOLATILE ORGANIC COMPOUND COMPOSITIONS BASED UPON ORGANIC SOLVENTS WHICH ARE NEGLIGIBLY REACTIVE WITH HYDROXYL RADICAL AND DO NOT CONTRIBUTE APPRECIABLY TO THE FORMATION OF GROUND BASED OZONE

CROSS-NOTING TO RELATED APPLICATIONS

This application claims the benefit of U.S. Provisional Application Ser. No. 60/053,073, filed Jul. 18, 1997.

BACKGROUND OF THE INVENTION

This invention pertains to the art of solvent blends and solvent/resin blends. More, particularly this invention pertains to blends that do not contribute to the formation of ground based ozone or smog. The invention is particularly applicable to solvent blends and solvent/resin blends that have no volatile organic compounds for use with adhesives, coatings, inks, cleaning and blowing agents and the like and will be described with particular reference thereto. However, it will be appreciated that the invention may be advantageously employed in other environments and applications.

Heretofore, hydrocarbon-based solvents have been used to dissolve organic materials in many industrial applications. However, recently, hydrocarbon-based solvents have fallen out of favor because they have been classified by the United States Environmental Protection Agency and other international regulatory bodies as materials that contribute to the formation of ground based ozone or smog. This has created a need for other types of solvents for the production of coatings, adhesives, inks and the like.

Upon evaporation, a highly-reactive, hydrocarbon-based solvent reacts with hydroxyl radicals and ultraviolet light very close to the ground to form a photochemical smog that is considered harmful and in some cases dangerous. Some cities have severe smog which reduces visibility and actually causes "ozone alerts". In part, the smog is caused by hydrocarbon emissions from cars. However, another major contributor is industrial use of hydrocarbon-based solvents such as hexane and toluene.

The benchmark for desired reaction rates of hydrocarbon-based compounds is ethane. If a compound has a reaction rate with the hydroxyl radical and ultraviolet ("UV") light that is faster than ethane, the compound reacts too close to the ground and consequently generates ozone and smog. Such compounds are defined as volatile organic compounds (VOCs). On the other hand, if a compound has a reaction rate that is slower than ethane, the compound reaches higher into the atmosphere before reacting with the hydroxyl radical and UV light. In such instances the non-VOC compound does not contribute to the formation of ground based ozone and smog.

Some of the more reactive VOCs are:
toluene;
methyl ethyl ketone;
diacetone alcohol;
hexane;
isopropyl alcohol;
pentane;
dibasic esters;
trichloroethylene;
benzene;
ethyl acetate;
butyl acetate;
n-methyl pyrollidone;
glycol ethers;
d-limonene;
terpene hydrocarbon solvents;
dimethyl ether; and,
tetrahydrofuran.

Governmental regulations limit the use of VOCs in coatings, inks, and adhesives. As a result, water-borne coatings have become the most important type of coatings in coating and adhesive systems. However, water-borne coatings must contain some volatile organic compound content. This is because water flashes off too fast from the water-based latex or emulsion to make a good film. To alleviate this problem, 7–10% of a slower evaporating solvent such as a glycol ether is added to the latex to aid in film formation. Unfortunately, glycol ethers are primary examples of VOCs and thus dangerous to the environment.

Halogenated hydrocarbon-based compounds have reaction rates that are slower than ethane. However, these halogenated compounds are ozone depleting. consequently, they are not suitable VOC-free solvents.

In the prior art, U.S. Pat. No. 5,102,563 to Desbiendras describes a solvent composition which contains methyl tert butyl ether. However, methyl tert butyl ether is a VOC and thus unsafe for the environment. Similarly, U.S. Pat. No. 4,898,893 to Ashida describes a composition for making a blowing agent which contains a flammable aliphatic hydrocarbon. This is also a VOC. U.S. Pat. No. 3,950,185 to Toyama teaches film removing compositions which contain methylene chloride and bromochloromethane which are not VOCs. However, these compositions also contain methanol and monochlorobenzene which are VOCs. U.S. Pat. No. 3,924,455 to Begishagen describes a formulation containing mineral spirits which removes lacquer stress coatings. These mineral spirits are also VOCs.

An object of the present invention is the identification of some high-performance solvents and solvent/resin blends which are non-flammable or self-extinguishing and do not contribute to the formation of ground-based ozone.

Another object of the present invention are solvents and solvent/resin blends that are safer to the environment than even water-based systems which still must contain a volatile organic solvent to aid in film formation.

Yet another object of the present invention are environmentally-safer solvent compositions which do not contribute to the formation of ground based ozone which will be useful in the formulation of cleaning agents, coatings, adhesives, inks and also blowing agents for the production of plastic foams.

SUMMARY OF THE INVENTION

The present invention contemplates new and improved solvent and solvent-resin compositions which overcome all of the above referenced problems and others and which are economical and effective for their intended uses.

In accordance with the present invention, there is provided a solvent-resin composition having generally zero volatile organic compounds (VOCs). The composition consists essentially of a resin component and a solvent component. The solvent component is 5–95% by total volume of the solvent-resin composition and is one or more of the zero-VOC solvents selected from the group consisting of:
chlorobromomethane;

1-bromopropane;
n-alkane (C12–C18);
t-butyl acetate;
perchloroethylene;
benzotrifluoride;
parachlorobenzotrifluoride;
acetone;
1,2-dichloro-1,1,2-trifluoroethane;
dimethoxymethane;
1,1,1,2,2,3,3,4,4-nonafluoro-4-methoxy-butane;
2-(difluoromethoxymethyl)-1,1,1,2,3,3,3-heptafluoropropane;
1-ethoxy-1,1,2,2,3,3,4,4,4-nonafluorobutane; and,
2-(ethoxydifluoromethyl)-1,1,1,2,3,3,3-heptafluoropropane.

In accordance with a more limited aspect of the invention, the solvent component is present in the amount 40–95% by total volume of the composition.

In accordance with a still more limited aspect of the invention, the solvent component is present in the amount 30%–80% by total volume of the composition.

A principal advantage of the invention is that it is environmentally safer yet still capable of effectively dissolving resins.

Another advantage of the invention is that it may be used in place of solvents currently used for inks, adhesives, coatings and the like.

Still other advantages and benefits of the invention will become apparent to those skilled in the art upon a reading and understanding of the following detailed description.

DETAILED DESCRIPTION OF THE PREFERRED EMBODIMENTS

The compositions of the present invention are high-performance solvent and solvent-resin blends that are generally free of VOCs. The compositions as herein described and as set forth in the claims are expressed in terms of percentages by volume unless clearly indicated to the contrary.

In describing the compositions of the present invention, reference will be made to certain resin classifications which require a totally VOC-free solvent system to be environmentally safe. These resin classifications are:
 a) acrylic-thermoplastic;
 b) acrylic-thermosetting;
 c) chlorinated rubber;
 d) epoxy (either one or two part);
 e) hydrocarbon (e.g., olefins, terpene resins, rosin esters, coumarone-indene, styrene-butadiene, styrene, methyl-styrene, vinyl-toluene, nitrocellulose, polychloroprene, polyamide, polyvinyl chloride and isobutylene);
 f) phenolic;
 g) polyester and alkyd;
 h) polyurethane;
 i) silicone;
 j) urea; and,
 k) vinyl and vinyl acetate.

It is to be appreciated that this list does not include all resin classifications. Other resin classifications are intended to be encompassed by the scope of the present invention.

Effective solvents of the present invention which have reaction rates with hydroxyl ion slower than ethane are:
 1) chlorobromomethane;
 2) 1-bromopropane;
 3) methyl acetate;
 4) n-alkane (C12–C18);
 5) t-butyl acetate;
 6) perchloroethylene;
 7) benzotrifluoride;
 8) parachlorobenzotrifluoride
 9) acetone;
 10) 1,2-dichloro-1,1,2-trifluoroethane
 11) dimethoxymethane;
 12) 1,1,1,2,2,3,3,4,4-nonafluoro-4-methoxy-butane;
 13) 2-(difluoromethoxymethyl)-1,1,1,2,3,3,3-heptafluoropropane;
 14) 1-ethoxy-1,1,2,2,3,3,4,4,4-nonafluorobutane;
 15) 2-(ethoxydifluoromethyl)-1,1,1,2,3,3,3-heptafluoropropane;
 16) methylene chloride; and,
 17) technical white oils (mineral oils).

It is to be appreciated that this list does not include all effective non-VOC solvents. Other effective non-VOC solvents are intended to be encompassed by the scope of the present invention.

The type of specific applications (hence the denotation "a" alongside the number identifying the application) for which the solvents and solvent-resin blends of the present invention may be used are as follows:
 1a) adhesives
 2a) blowing agents
 3a) coatings
 4a) cleaning compositions
 5a) inks The zero-VOC solvent and solvent-resin blends of the present invention as well as their applications are set forth in the table below. The table uses the identifiers set out above, i.e., a numeral alone for the solvent and a numeral followed by "a" for the application.

Solvent and Solvent-Resin Compositions having Zero Vocs

| MAIN COMPONENT | HOW USED (blends are 5–95% or, more preferably, 40–95% by vol.) | RESINS THAT FORM A FILM AFTER SOLVENT EVAPORATES | APPLICATIONS |
|---|---|---|---|
| chlorobromomethane | by itself or blended with any of solvents | a–k | 1a–5a |

-continued

| MAIN COMPONENT | HOW USED (blends are 5–95% or, more preferably, 40–95% by vol.) | RESINS THAT FORM A FILM AFTER SOLVENT EVAPORATES | APPLICATIONS |
|---|---|---|---|
| 1-bromopropane | 2–16 to obtain desired properties by itself or blended with solvents 1, 3–16 | a–k | 1a, 3a, 5a |
| methyl acetate | blended with solvents 1,2, 4–16 at 10–95% by volume. | a–d, styrene, g, j, k | 1a–5a |
| n-alkane (C12–C18) | by itself or blended with solvents 1–3, 5–16 | e | 1a, 3a, 4a, 5a |
| t-butyl acetate | by itself or blended with solvents 1, 4, 6–16 | a–d, styrene, g, j, k | 1a, 3a, 4a, 5a |
| perchloroethylene | 1–5, 7–16 | a–k | 1a, 3a, 4a, 5a |
| benzotrifluoride | 1–6, 8–16 | a–k | 1a, 3a, 4a, 5a |
| parachlorobenzotrifluoride | 1–7, 9–16 | a–k | 1a, 3a, 4a, 5a |
| acetone | 1–5, 7–16 | a, b, e–h, k | 1a–5a |
| 1,2-dichloro-1,1,2-trifluoroethane | 1–9, 11–16 | a, k | 1a–5a |
| dimethoxymethane | 1–3, 7–10, 12–16 | a | 1a–5a |
| 1,1,1,2,2,3,3,4,4-nonafluoro-4-methoxy-butane | 1–11, 13, 15 | a | 2a, 4a |
| 2-(difluoromethoxymethyl)-1,1,1,2,3,3,3-heptafluoropropane | 1–12, 14, 15 | a | 2a, 4a |
| 1-ethoxy-1,1,2,2,3,3,4,4,4-nonafluorobutane | 1–13, 15 | a | 2a, 4a |
| 2-(ethoxydifluoromethyl)-1,1,1,2,3,3,3-heptafluoropropane | 1–4 | a | 2a, 4a |
| methylene chloride | 2–15 | a–k | 1a–5a |
| technical white oils (mineral) | 1–16 | a, e, g | 5a |

A better understanding of the present invention can be had by reference to the following descriptions of embodiments which effectively meet the objectives outlined above.

One preferred embodiment includes mixing one or more of the polymeric resins:

acrylic-thermoplastic;
acrylic-thermosetting;
chlorinated rubber;
epoxy resin;
hydrocarbon (e.g., olefins, terpene resins, rosin esters, coumarone-indene, styrene-butadiene, styrene, methyl-styrene, vinyl-toluene, nitrocelullose, polychloroprene, polyamide, polyvinyl chloride and isobutylene);
phenolic;
polyester and/or alkyd;
polyurethane;
silicone;
urea; and/or
vinyl or vinyl acetate, with 10–90%, by total volume of the composition, of one or more of non-VOC solvents such as:

chlorobromomethane;
1-bromopropane;
methyl acetate;
n-alkane (C12–C18);
t-butyl acetate;
perchloroethylene;
benzotrifluoride;
parachlorobenzotrifluoride;
acetone;
1,2-dichloro-1,1,2-trifluoroethane;
dimethoxymethane; and/or
methylene chloride.

The individual solvents or blends thereof are added until all of the resin(s) is dissolved.

In an embodiment for coatings and/or adhesives, the mixture preferably has a high resin content, i.e., a resin content of 20%–60% by volume. In another embodiment for inks, the mixture preferably contains a lower concentration of the resin, i.e., 5%–30% by volume. In yet another embodiment, various pigments or additives are added to achieve a desired range of properties.

In another preferred embodiment of the present invention, 5–90% methyl acetate, by total volume of the composition, is added to 10–95% of a solvent or solvent blend selected from the group:

chlorobromomethane;
1-bromopropane;
n-alkane (C12–C18);
t-butyl Acetate;
perchloroethylene;
benzotrifluoride;
parachlorobenzotrifluoride;
acetone;
1,2-dichloro-1,1,2-trifluoroethane;
dimethoxymethane;
1,1,1,2,2,3,3,4,4-nonafluoro-4-methoxy-butane;
2-(difluoromethoxymethyl)-1,1,1,2,3,3,3-heptafluoropropane;
1-ethoxy-1,1,2,2,3,3,4,4,4-nonafluorobutane; and,
2-(ethoxydifluoromethyl)-1,1,1,2,3,3,3-heptafluoropropane.

These formulations are used as a cleaning composition for the removal of hydrocarbon or ionic contaminates from circuit boards or in the formulation of coatings, inks, or adhesives. Of course, the formulations may be used for other applications as well.

The following enumerated embodiments have the ability to dissolve resins for the production of coatings, adhesives, and inks as well. In addition, the embodiments are equally useful as cleaning formulations. The ranges for the embodiments are expressed in % by volume of the total solvent-resin composition or, alternatively, the total solvent composition of an initially non-resin containing solvent, such as a cleaning composition. The embodiments are:

(1) 10–90% benzotrifluoride and 10–90% of one or more of the solvents:
  (a) 1,1,1,2,2,3,3,4,4-nonafluoro-4-methoxy-butane;
  (b) 2-(difluoromethoxymethyl)-1,1,1,2,3,3,3-heptafluoropropane;
  (c) 1-ethoxy-1,1,2,2,3,3,4,4,4-nonafluorobutane;
  (d) 2-(ethoxydifluoromethyl)-1,1,1,2,3,3,3-heptafluoropropane;
  (e) perchloroethylene;
  (f) 1-bromopropane;
  (g) acetone;
  (h) n-alkane (C12–C16);
  (i) t-buytl acetate (C12–C16); and,
  (j) parachlorobenzotrifluoride;
(2) 5–20% benzotrifluoride and 80–95% 1-bromopropane;
(3) 10–90% acetone and 10–90% n-alkane(C12–C18);
(4) 10–90% 1-bromopropane and 10–90% of one or more of:
  (a) chlorobromomethane; and,
  (b) n-alkane (C12-C18);
(5) 10–90% parachlorobenzotrifluoride and 10–90% of one or more of:
  (a) 1-bromopropane;
  (b) chlorobromomethane;
  (c) t-butyl acetate; and,
  (d) n-alkane (C12–C18);
(6) 10–90% 1,2-dichloro-1,1,1-trifluoroethane and 10–90% of one or more of:
  1,1,1,2,2,3,3,4,4-nonafluoro-4-methoxy-butane;
  2-(difluoromethoxymethyl)-1,1,1,2,3,3,3-heptafluoropropane;
  1-ethoxy-1,1,2,2,3,3,4,4,4-nonafluorobutane; and,
  2-(ethoxydifluoromethyl)-1,1,1,2,3,3,3-heptafluoropropane;
  1-bromopropane
  acetone;
  benzotrifluoride; and,
  methyl acetate.

Analogously, the following VOC-free embodiment has the ability to dissolve resins for the production of coatings, adhesives, and inks as well. In addition, the embodiment is equally useful in cleaning formulations:

10–90% methylene chloride and 10–90% of one or more of the following solvents:
  chlorobromomethane;
  1-bromopropane;
  methyl acetate;
  n-alkane (C12–C18);
  t-butyl acetate;
  perchloroethylene;
  benzotrifluoride;
  parachlorobenzotrifluoride;
  acetone;
  1,2-dichloro-1,1,2-trifluoroethane; and,
  dimethoxymethane.

An added benefit to mixing methylene chloride with other solvents is the reduction in the overall toxicity of methylene chloride.

Other preferred solvent-resin compositions include VOC-free solvents which have the ability to dissolve resins for the production of coatings, adhesives, and inks. The compositions include any of the above-listed resins and the following solvent mixtures, which are expressed in terms of % by volume of the solvent-resin composition:

(1) 1–20% technical white oil and 10–90% n-alkane (C12–C18);
(2) 1–20% technical white oil and 10–90% methyl acetate;
(3) 1–20% technical white oil and 10–90% t-butyl acetate;
(4) 1–20% technical white oil and 10–90% benzotrifluoride;
(5) 1–20% technical white oil and 10–90% acetone;
(6) 1–20% technical white oil and 10–90% parachlorobenzotrifluoride;
(7) 1–20% technical white oil and 10–90% parachlorobenzotrifluoride;
(8) 1–20% technical white oil and 10–90% perchloroethylene;
(9) 1–20% technical white oil and 10–90% methylene chloride; and,
(10) 1–20% technical white oil and 10–90% of a mixture of methylene chloride, acetone, t-butyl acetate, methyl acetate and perchloroethylene.

The following VOC-free embodiment, expressed in terms of % by volume of total composition, is useful as an environmentally-safer blowing agent composition for the production of polyurethane or isocyanurate foams:

99–99.98% 1,2-dichloro-1,1,1-trifluoroethane and 0.01–0.5% alpha-methyl styrene to inhibit polymerization. In addition this embodiment has the ability to dissolve resins for the production of coatings, adhesives, and inks, and is useful in cleaning formulations.

Another embodiment useful as an environmentally-safer blowing agent composition is:

100 parts by weight polyether triol;

50 parts by weight toluene diisocyanate or toluene diisocyanurate;

2 parts by weight water;

0.15 parts catalyst;

0.5–2 parts surfactant; and,

4–10 parts 1-bromopropane or chlorobromomethane.

Still another embodiment useful as an environmentally-safer blowing agent composition, in terms of percent by weight of the total composition (including catalyst and surfactant), is:

50–70% polyether triol;

20–40% toluene diisocyanate or toluene disocyanurate;

0–10% water;

0–5% catalyst;

0–5% surfactant;

2–15% 1-bromopropane or chlorobromomethane. The appropriate catalysts and surfactants are selected from those known in the art.

A more limited embodiment useful as an environmentally-safer blowing agent composition, in terms of percent by weight of the total composition (including catalyst and surfactant), is:

60–65% polyether triol;

30–33% toluene diisocyanate or toluene disocyanurate;

1–2% water;

0.09–2% catalyst;

0.3–1.5% surfactant; and, 2.4–6.1% 1-bromopropane or chlorobromomethane.

This composition is useful for the manufacture of a flexible furniture grade foam with a density of 0.024 g/cm$^3$. blowing agent.

An embodiment of a zero-VOC adhesive is 350 grams of 1-bromopropane and/or benzotriflouride to which is added 30–50% by weight of a hydrocarbon resin, preferably an olefin, rosin ester or terpene resin, which acts as a tackifier. Then, 100 grams of styrene-butadiene polymer, polychloroprene polymer, polyvinyl chloride polymer, acrylic, epoxy, urethane, nitrocellulose, or styrene is added to the mixture. This mixture produces a contact adhesive with excellent bond strength. Another preferred embodiment of this mixture contains approximately 40–90%, volume, of 1-bromopropane and/or benzotriflouride, 5–35% of a hydrocarbon resin, and 5–25% of styrene-butadiene polymer, polychloroprene polymer, polyvinyl chloride polymer, acrylic, epoxy, urethane, nitrocellulose, or styrene.

Another zero-VOC adhesive starts with 100 grams of 1-bromopropane and/or benzotriflouride. Then, 10–100 grams of styrene-butadiene, polychloroprene, polyvinyl chloride, acrylic, epoxy, urethane, nitrocellulose, or styrene polymer or resin is added. This also produces a contact adhesive with excellent bond strength. It is appreciated that other additives may be used to improve wetting and defoaming although they are not always required. Another preferred embodiment of this mixture contains approximately 40–95%, by volume, of 1-bromopropane and/or benzotriflouride, and 5–60% of styrene-butadiene, polychloroprene, polyvinyl chloride, acrylic, epoxy, urethane, nitrocellulose, or styrene polymer or resin. Still another preferred embodiment of this mixture contains approximately 70–95%, by volume, of 1-bromopropane and/or benzotriflouride, and 5–30% of styrene-butadiene, polychloroprene, polyvinyl chloride, acrylic, epoxy, urethane, nitrocellulose, or styrene polymer or resin.

Still another embodiment of a zero-VOC adhesive starts with 350 g 1-bromopropane and/or benzotriflouride. Then, 20–100 grams of styrene butadiene rubber is added. Optionally, 5–10%, by volume, acetone is added to improve solubility if necessary. Another preferred embodiment of this mixture contains approximately 50–90%, by volume, of 1-bromopropane, and 10–30% of acrylic polymer or urethane polymer. Optionally, 5–10%, by volume, acetone is added to improve solubility if necessary.

The following VOC-free embodiment has the ability to dissolve resins for the production of coatings, adhesives, and inks as well. Further, the solvent includes stabilizers to stabilize against attack on aluminum. In addition, the embodiment is useful in cleaning formulations:

70–90%, by volume, 1,2-dichloro-1,1,1-trifluoroethane;

9–29% dimethoxymethane; and 0.5% butylene oxide and 0.5% nitromethane to stabilize against attack on aluminum. Optionally, 5–10%, by volume, acetone is added to the total composition to improve solubility if necessary.

All of the embodiments of the present invention may interchangeably use any of the other non-VOC solvents listed above.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A solvent-resin composition consisting essentially of a resin component and a solvent component, the solvent component being 5–95% by total volume of the solvent-resin composition, the solvent component being one or more zero-VOC, non-ground based ozone forming solvents selected from the group consisting of:

1) chlorobromomethane;

2) 1-bromopropane;

3) methyl acetate;

4) n-alkane (C12–C18);

5) t-butyl acetate;

6) perchloroethylene;

7) benzotrifluoride;

8) parachlorobenzotrifluoride;

9) acetone;

10) 1,2-dichloro-1,1,2-trifluoroethane 11) dimethoxymethane;

12) 1,1,1,2,2,3,3,4,4-nonafluoro-4-methoxy-butane;

13) 2-(difluoromethoxymethyl)-1,1,1,2,3,3,3-heptafluoropropane;

14) 1-ethoxy-1,1,2,2,3,3,4,4,4-nonafluorobutane;

15) 2-(ethoxydifluoromethyl)-1,1,1,2,3,3,3-heptafluoropropane;

16) methylene chloride; and, 17) technical white oils (mineral oils).

2. The composition according to claim 1 wherein the solvent component is present in the amount 40–95% by total volume of the composition.

3. The composition according to claim 2 for use as an adhesive wherein the solvent component is present in the amount 30–80% by total volume of the composition.

4. The composition according to claim 2 for use as an ink wherein the solvent component is present in the amount 70–95% by total volume of the composition.

5. The composition according to claim 1 wherein the solvent component is present in the amount 10–90%, by total volume of the composition, and is a mixture of at least two solvents wherein at least one solvent is selected from the group consisting of:
chlorobromomethane;
1-bromopropane;
methyl acetate;
n-alkane (C12–C18);
t-butyl acetate;
perchloroethylene;
benzotrifluoride;
parachlorobenzotrifluoride;
acetone;
1,2-dichloro-1,1,2-trifluoroethane;
dimethoxymethane; and
methylene chloride.

6. The composition according to claim 1 wherein the solvent component is present in the amount 10–95% by total volume of the composition, the solvent component consisting essentially of methyl acetate and at least one additional solvent selected from the group consisting of:
chlorobromomethane;
1-bromopropane;
n-alkane (C12–C18);
t-butyl acetate;
perchloroethylene;
benzotrifluoride;
parachlorobenzotrifluoride;
acetone;
1,2-dichloro-1,1,2-trifluoroethane;
dimethoxymethane;
1,1,1,2,2,3,3,4,4,-nonafluoro-4-methoxy-butane;
2-(difluoromethoxymethyl)-1,1,1,2,3,3,3-heptafluoropropane;
1-ethoxy-1,1,2,2,3,3,4,4,4-nonafluorobutane; and,
2-(ethoxydifluoromethyl)-1,1,1,2,3,3,3-heptafluoropropane.

7. The composition according to claim 1 wherein the solvent component, expressed in terms of % by total volume of the composition, is selected from the group consisting of:
1) 10–90% benzotrifluoride and 90–10% of one or more of the solvents:
a) 1,1,1,2,2,3,3,4,4-nonafluoro-4-methoxy-butane;
b) 2-(difluoromethoxymethyl)-1,1,1,2,3,3,3,-heptafluoropropane;
c) 1-ethoxy-1,1,2,2,3,3,4,4,4-nonafluorobutane;
d) 2-(ethoxydifluoromethyl)-1,1,1,2,3,3,3-heptafluoropropane;
e) perchloroethylene;
f) 1-bromopropane;
g) acetone;
h) n-alkane (C12–C16);
i) t-butyl acetate; and,
j) parachlorobenzotrifluoride;
2) 5–20% benzotrifluoride and 95–80% 1-bromopropane;
3) 10–90% acetone and 10–90% n-alkane (C12–C18);
4) 10–90% 1-bromopropane and 90–10% of one or more of:
a) chlorobromomethane; and,
b) n-alkane (C12–C18);
5) 10–90% parachlorobenzotrifluoride and 90–10% of one or more of:
a) 1-bromopropane;
b) chlorobromomethane;
c) t-butyl acetate; and,
d) n-alkane (C12–C18); and,
6) 10–90% 1,2-dichloro-1,1,1-trifluoroethane and 90–10% of one or more of:
a) 1,1,1,2,2,3,3,4,4-nonafluoro-4-methoxy-butane;
b) 2-(difluoromethoxymethyl)-1,1,1,2,3,3,3-heptafluoropropane;
c) 1-ethoxy-1,1,2,2,3,3,4,4,4-nonafluorobutane;
d) 2-(ethoxydifluoromethyl)-1,1,1,2,3,3,3-heptafluoropropane;
e) 1-bromopropane;
f) acetone;
g) benzotrifluoride; and,
h) methyl acetate.

8. The composition according to claim 1 wherein the solvent component consists essentially of 10–90% methylene chloride and 10–90% of one or more of the solvents selected from the group consisting of:
chlorobromomethane;
1-bromopropane;
methyl acetate;
n-alkane (C12–C18);
t-butyl acetate;
perchloroethylene;
benzotrifluoride;
parachlorobenzotrifluoride;
acetone;
1,2-dichloro-1,1,2-trifluoroethane; and,
dimethoxymethane.

9. The composition according to claim 1 for use as a blowing agent wherein the solvent component consists essentially of:
99–99.98%, by total volume of the solvent component, 1,2-dichloro-1,1,1-trifluoroethane and
0.01–0.5%, by total volume of the solvent component, alpha-methyl styrene to inhibit polymerization.

10. The composition according to claim 1 wherein the solvent consists essentially of 50–90%, by volume, 1-bromopropane, and the resin consists essentially of 10–30% of one or more of resins selected from the group of acrylic, thermoplastic or thermosetting polymers and urethane polymers.

11. The composition of claim 10 wherein the resin is a thermoplastic or thermosetting acrylic polymer.

12. The composition according to claim 1 wherein the solvent consists essentially of 45–85%, by volume, of 1-bromopropane, and the resin consists essentially of 10–30% of acrylic polymer or urethane polymer, and 5–10%, by volume, acetone to improve solubility.

13. The composition according to claim 1, wherein the solvent consists essentially of 40–90%, by total volume of the composition, 1-bromopropane, and wherein the resin consists essentially of 5–35% of a hydrocarbon resin, and 5–25% of at least one of styrene-butadiene, polychloroprene, polyvinyl chloride, acrylic, epoxy, urethane, nitrocellulose, or styrene resins.

14. The composition according to claim 13, wherein the hydrocarbon resin is selected from the group of olefin, rosin ester, and terpene.

15. The composition according to claim 1 wherein the solvent consists essentially of:
   70–90%, by volume, 1,2-dichloro-1,1,1-trifluoroethane;
   9–29% dimethoxymethane; and,
   0.5% butylene oxide and 0.5% nitromethane to stabilize the composition.

16. The composition according to claim 15 wherein approximately 5–10% by volume acetone is added to the composition to improve solubility as necessary.

17. The composition according to claim 1 wherein the solvent component, expressed in terms of % by total volume of the composition, consists essentially of 1–20% technical white oil and 10–90% of one or more solvents selected from the group consisting of:
   (1) n-alkane (C12–C18);
   (2) methyl acetate;
   (3) t-butyl acetate;
   (4) benzotrifluoride;
   (5) acetone;
   (6) parachlorobenzotrifluoride;
   (7) parachlorobenzotrifluoride;
   (8) perchloroethylene; and,
   (9) methylene chloride; and,
   (10) a mixture of methylene chloride, acetone, t-butyl acetate, methyl acetate and perchloroethylene.

18. The composition according to claim 17 wherein the solvent component, expressed in terms of % by total volume of the composition, consists essentially of 1–20% technical white oil and 10–90% of one or more of: methylene chloride; acetone; t-butyl acetate; methyl acetate; and, perchloroethylene.

19. A solvent-resin composition for use as an adhesive consisting essentially of a resin component and a zero-VOC solvent component, wherein the zero-VOC solvent component is 40–90% by total volume of the composition, and is 1-bromopropane.

20. A solvent-resin composition consisting essentially of a resin component and a zero-VOC solvent component, wherein the zero-VOC solvent component is 40–95%, by total volume of the composition, 1-bromopropane, and the resin component is 5–60% of one or more resins selected from the group consisting of acrylic, epoxy, urethane, nitrocellulose, styrene, polyvinyl chloride, and polychloroprene resins.

21. The composition according to claim 20 wherein the zero-VOC solvent consists essentially of 70–95%, by total volume of the composition, 1-bromopropane, and the resin consists essentially of 5–30% of one or more of resins selected from the group of acrylic, epoxy, urethane, nitrocellulose, styrene, polyvinyl chloride, and polychloroprene resins.

22. A resin-solvent composition for use as an adhesive comprising:
   40–90%, by total volume of the composition, of one or more of 1-bromopropane and benzotrifluoride,
   5–35% of a hydrocarbon resin as a tackifier, and
   5–25% of a resin, selected from one or more of styrene-butadiene, polychloroprene, polyvinyl chloride, acrylic, epoxy, uretharie, nitrocellulose, and styrene resins.

23. The composition according to claim 22 wherein at least a portion of the hydrocarbon resin is selected from the group of olefin, rosin ester and terpene.

24. A composition for use as a blowing agent in the manufacture of resin foams, the composition comprising, by total weight of the composition:
   50–70% polyether triol;
   20–40% of one or more of toluene diisocyanate and toluene disocyanurate;
   0–5% catalyst;
   0–5% surfactant;
   0–10% water; and,
   2–15% of one or more of: 1-bromopropane; chlorobromomethane.

25. The composition according to claim 24 wherein:
   the polyether triol is present in the amount 60–65%;
   the one or more of toluene diisocyanate and toluene disocyanurate is present in the amount of 30–33%;
   the water is present in the amount of 1–2%;
   the catalyst is present in the amount of 0.09–2%;
   the surfactant is present in the amount of 0.3–1.5%; and,
   the one or more of 1-bromopropane and chlorobromomethane is present in the amount of 2.4–6.1%.

26. A cleaning composition consisting essentially of zero volatile organic compounds (VOCs), the composition consisting essentially of one or more of the zero-VOC solvents selected from the group consisting of:
   chlorobromomethane;
   1-bromopropane;
   n-alkane (C12–C18);
   t-butyl acetate;
   perchloroethylene;
   benzotrifluoride;
   parachlorobenzotrifluoride;
   acetone;
   1,2-dichloro-1,1,2-trifluoroethane;
   dimethoxymethane;
   1,1,1,2,2,3,3,4,4-nonafluoro-4-methoxy-butane;
   2-(difluoromethoxymethyl)-1,1,1,2,3,3,3-heptafluoropropane;
   1-ethoxy-1,1,2,2,3,3,4,4,4-nonafluorobutane; and,
   2-(ethoxydifluoromethyl)-1,1,1,2,3,3,3-heptafluoropropane.

27. The cleaning composition of claim 26 wherein the one or more solvents, expressed in terms of total volume of the composition, is selected from the group consisting of:
   (1) 10–90% benzotrifluoride and 10–90% of one or more of the solvents:
     (a) 1,1,1,2,2,3,3,4,4-nonafluoro-4-methoxy-butane;
     (b) 2-(difluoromethoxymethyl)-1,1,1,2,3,3,3-heptafluoropropane;
     (c) 1-ethoxy-1,1,2,2,3,3,4,4,4-nonafluorobutane;
     (d) 2-(ethoxydifluoromethyl)-1,1,1,2,3,3,3-heptafluoropropane;
     (e) perchloroethylene;
     (f) 1-bromopropane;
     (g) acetone;
     (h) n-alkane (C12–C16);
     (i) t-buytl acetate (C12–C16); and,
     (j) parachlorobenzotrifluoride;
   (2) 5–20% benzotrifluoride and 80–95% 1-bromopropane;
   (3) 10–90% acetone and 10–90% n-alkane(C12–C18);
   (4) 10–90% 1-bromopropane and 10–90% of one or more of:

(a) chlorobromomethane; and,
(b) n-alkane (C12–C18);
(5) 10–90% parachlorobenzotrifluoride and 10–90% of one or more of:
(a) 1-bromopropane;
(b) chlorobromomethane;
(c) t-butyl acetate; and,
(d) n-alkane (C12–C18);
(6) 10–90% 1,2-dichloro-1,1,1-trifluoroethane and 10–90% of one or more of:
1,1,1,2,2,3,3,4,4-nonafluoro-4-methoxy-butane;
2-(difluoromethoxymethyl)-1,1,1,2,3,3,3-heptafluoropropane;
1-ethoxy-1,1,2,2,3,3,4,4,4-nonafluorobutane;
2-(ethoxydifluoromethyl)-1,1,1,2,3,3,3-heptafluoropropane;
1-bromopropane
acetone;
benzotrifluoride; and,
methyl acetate.

28. A solvent-resin composition consisting essentially of a resin component and a solvent component wherein the solvent component comprises 5% to 95% by total volume of the solvent-resin composition, further wherein the solvent is one or more zero-VOC, non ground based ozone forming solvents selected from the group consisting of:
1) 1-bromopropane;
2) t-butylacetate;
3) methyl acetate;
4) benzotrifluoride;
5) acetone;
6) methylene chloride; and,
7) technical white oils (mineral oils).

29. The composition of claim 28 wherein the solvent is 1-bromopropane.

30. The composition of claim 28 wherein the solvent is t-butyl acetate.

31. The composition of claim 28 wherein the solvent is methyl acetate.

32. The composition of claim 28 wherein the solvent is benzotrifluoride.

33. The composition of claim 28 wherein the solvent is acetone.

34. The composition of claim 28 wherein the solvent is methylene chloride.

35. The composition of claim 28 wherein the solvent is technical white oil.

36. A solvent-resin composition comprising a resin component and a solvent component, wherein the solvent component comprises 5% to 95% by total volume of the solvent-resin composition, further wherein the solvent is 1-bromopropane and the resin is a styrene polymer.

37. The composition of claim 36 wherein the styrene polymer is styrene butadiene rubber.

38. The composition of claim 36 further comprising a tackifier.

39. The composition of claim 37 further comprising tackifier.

40. A zero-VOC cleaning composition consisting essentially of the zero-VOC solvent, t-butyl acetate.

* * * * *

UNITED STATES PATENT AND TRADEMARK OFFICE
CERTIFICATE OF CORRECTION

PATENT NO. : 6,048,471
DATED : Apr. 11, 2000
INVENTOR(S) : Richard G. Henry

It is certified that error appears in the above-identified patent and that said Letters Patent is hereby corrected as shown below:

On the title page, item [73] should read
    Assignee: Polymer Solvents L.L.C.
                 Beachwood, Ohio Signed and Sealed this Twentieth Day of February, 2001

Attest:

NICHOLAS P. GODICI

Attesting Officer    Acting Director of the United States Patent and Trademark Office